(12) United States Patent
Yadav et al.

(10) Patent No.: US 11,271,854 B2
(45) Date of Patent: Mar. 8, 2022

(54) RESOLVING LABEL DEPTH AND PROTECTION IN SEGMENT ROUTING

(71) Applicant: Ciena Corporation, Hanover, MD (US)

(72) Inventors: Bhupendra Yadav, Kanata (CA); Anand Srinivasan, Kanata (CA); Gerald Smallegange, Ottawa (CA)

(73) Assignee: Ciena Corporation, Hanover, MD (US)

( * ) Notice: Subject to any disclaimer, the term of this patent is extended or adjusted under 35 U.S.C. 154(b) by 36 days.

(21) Appl. No.: 16/797,092

(22) Filed: Feb. 21, 2020

(65) Prior Publication Data
US 2021/0266251 A1 Aug. 26, 2021

(51) Int. Cl.
*H04L 12/26* (2006.01)
*H04L 45/50* (2022.01)
*H04L 45/00* (2022.01)
*H04L 45/28* (2022.01)
*H04L 45/74* (2022.01)
*H04L 49/201* (2022.01)

(52) U.S. Cl.
CPC .............. *H04L 45/50* (2013.01); *H04L 45/04* (2013.01); *H04L 45/22* (2013.01); *H04L 45/28* (2013.01); *H04L 45/34* (2013.01); *H04L 45/74* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 8,116,308 B2 | 2/2012 | Ellis et al. | |
| 8,504,727 B2 | 8/2013 | Mohan et al. | |
| 9,094,337 B2 | 7/2015 | Bragg et al. | |
| 9,197,493 B2 | 11/2015 | Holness et al. | |
| 10,069,639 B2 | 9/2018 | Bragg et al. | |

(Continued)

FOREIGN PATENT DOCUMENTS

CN 109802888 A 5/2019

OTHER PUBLICATIONS

C. Filsfils et al., Internet Engineering Task Force (IETF), Segment Routing Architecture, Standards Track, ISSN: 2070-1721, Jul. 2018. pp. 1-32.

(Continued)

*Primary Examiner* — Phirin Sam
(74) *Attorney, Agent, or Firm* — Clements Bernard Baratta; Lawrence A. Baratta, Jr.; Christopher L. Bernard

(57) ABSTRACT

A source node in a first domain in a multi-domain network includes a plurality of ports; and switching circuitry configured to forward packets between the plurality of ports, wherein the source node is configured to, for a packet destined for a destination node in another domain in the multi-domain network, add a list of Segment Identifiers (SIDs) to the packet for loose source-based routing from the source node, through the first domain, and to the another domain, and forward the packet via a port of the plurality of ports and with the list of SIDs, wherein the list of SIDs includes at least one SID representing both an anycast SID and a binding SID. The SID is associated with an anycast group that includes a plurality of nodes, and with a binding segment in the second domain, the binding segment includes a different SID list for each node of the plurality of nodes.

20 Claims, 11 Drawing Sheets

(56) References Cited

U.S. PATENT DOCUMENTS

| | | |
|---|---|---|
| 10,469,367 B2 | 11/2019 | Filsfils et al. |
| 10,541,923 B2 | 1/2020 | Skalecki et al. |
| 10,887,225 B1 * | 1/2021 | Chan ...................... H04L 45/20 |
| 2007/0268817 A1 | 11/2007 | Smallegange et al. |
| 2008/0273472 A1 | 11/2008 | Bashford et al. |
| 2017/0230274 A1 * | 8/2017 | Filsfils ................... H04L 45/02 |
| 2018/0365560 A1 * | 12/2018 | Qiao ................... G06F 21/6245 |
| 2020/0014146 A1 * | 1/2020 | Aoshima .......... H01R 13/62938 |
| 2020/0127913 A1 * | 4/2020 | Filsfils ................... H04L 45/04 |
| 2020/0389401 A1 * | 12/2020 | Enguehard ............. H04L 45/64 |
| 2021/0014084 A1 * | 1/2021 | Torvi ..................... H04L 45/34 |
| 2021/0168125 A1 * | 6/2021 | Vemulpali ............. H04L 9/3226 |
| 2021/0250283 A1 * | 8/2021 | Arora ..................... H04L 45/02 |
| 2021/0258249 A1 * | 8/2021 | Torvi ..................... H04L 45/34 |

OTHER PUBLICATIONS

Filsfils et al., "Segment Routing Policies With Built-In Resiliency," Technical Disclosure Commons, Defensive Publications Series, Jan. 2020, pp. 1-7.

Jun. 22, 2021, Extended European Search Report for European Patent Application No. EP 21 15 8074.

* cited by examiner

RESOLVING LABEL DEPTH AND PROTECTION IN SEGMENT ROUTING

FIELD OF THE DISCLOSURE

The present disclosure generally relates to networking. More particularly, the present disclosure relates to systems and methods for resolving label depth and protection using a Branch Segment Identifier (SID) in a loose source routing-based technology in a homogeneous or heterogeneous network with one or multiple transport domains.

BACKGROUND OF THE DISCLOSURE

Multiprotocol Label Switching (MPLS)-based networks use labels to direct data from one node to the next based on short path labels rather than long network addresses, thus avoiding complex lookups in a routing table and therefore speeding traffic flow. MPLS has problems with the protection of inter-domain traffic, with respect to service level agreements. Specifically, an MPLS-based network could not guarantee switchover time as it does not have the visibility into the transit domains. Segment Routing (SR)-based networks can be a variant of MPLS, using headers (labels) with a list of segments for directing packets. SR-based networks also cannot guarantee service levels agreed in terms of time or bandwidth in inter-domain border node failure scenarios. As described herein, the term labels is used, but those of ordinary skill in the art will recognize this may be headers or other identifiers loose source routing-based technology in a homogeneous or heterogeneous network with one or multiple transport domains. For inter-domain transport, there is a requirement for label stacking, which includes adding labels to packets that already have labels. Label stacking is limited (in MPLS, SR, and other types of networks) by the number of labels imposed on the head end. Label stacking may be constrained due to hardware or the like. For example, some hardware (e.g., circuitry) based solutions limit the number of labels to three or four, thus constraining label stack depth. This limitation has led to the constraint of not providing enough labels for protection in inter-domain networks.

An existing solution to the label stacking problem, such as in MPLS, includes end-to-end signaling to achieve redundant paths to accomplish reliability. For example, a protected path needs to be computed a priori using Constrained Shortest Path First (CSPF) with the link states and attributes sent through Type-Length-Value (TLV) fields using routing protocols such as Open Shortest Path First (OSPF) or Intermediate System-Intermediate System (ISIS) and can exceed label stack depth, removing the label stack depth impediment. However, end-to-end signaling is an inflexible approach.

BRIEF SUMMARY OF THE DISCLOSURE

The present disclosure relates to systems and methods for resolving label depth and protection with a Branch Segment Identifier (SID) in a loose source routing-based technology in a homogeneous or heterogeneous network with one or multiple transport domains. Specifically, the present disclosure includes a new Segment Identifier (SID), referred to herein as a Branch SID, that provides protection across domains while operating within the label depth constraints. The present disclosure addresses the label depth problem and protection across domains in SR, MPLS, or any other loose source-based routing protocol. The Branch SID can be a new type of Segment ID that is similar to a Binding SID (BSID) from an SR Global Block (SRGB). The Branch SID is allocated on dual-homed border nodes and flooded upstream as an anycast SID. This BSID can be bound to any transport type to take the traffic across a domain.

In an embodiment, a source node in a first domain in a multi-domain network includes a plurality of ports; and switching circuitry configured to forward packets between the plurality of ports, wherein the source node is configured to, for a packet destined for a destination node in another domain in the multi-domain network, add a list of Segment Identifiers (SIDs) to the packet for loose source-based routing from the source node, through the first domain, and to the another domain, and forward the packet via a port of the plurality of ports and with the list of SIDs, wherein the list of SIDs includes at least one SID representing both an anycast SID and a binding SID. The at least one SID can be associated with an anycast group that includes a plurality of nodes in a second domain, connected to the first domain. The first domain can be configured to send the packet with the at least one SID to a closest node of the plurality of nodes. The at least one SID can be associated with a binding segment in the second domain, and the binding segment includes a different SID list for each node of the plurality of nodes. The second domain can be the another domain. The second domain can be a transit domain between the first domain and the another domain. The plurality of nodes can be border nodes that are dual homed between the first domain and the second domain.

In another embodiment, a border node in a multi-domain network includes a plurality of ports; and switching circuitry configured to forward packets between the plurality of ports, wherein the border node is configured to receive a packet from a first domain, the packet is destined for a destination node in a same domain as the border node or another domain in the multi-domain network, pop a Segment Identifier (SID) from the packet, wherein the SID represents both an anycast SID and a binding SID, the packet being sent to the border node from the first domain based on the presence of the border node in an anycast group associated with the SID, add one or more SIDs to the packet based on a policy associated with a binding segment for the SID, and forward the packet with the one or more SIDs. The SID can be associated with the anycast group that includes a plurality of nodes in the same domain or another domain, connected to the first domain. The first domain can be configured to send the packet with the SID to a closest node in the same domain. The SID can be associated with the binding segment in the same domain or another domain, and the binding segment includes a different SID list for the border node from another node of the plurality of nodes. The border node can be in the same domain as the destination node. The border node can be in a transit domain between the first domain and a domain containing the destination node. The border node can be dual homed between the first domain and the same domain or another domain, with one or more nodes of the plurality of nodes.

In a further embodiment, a method includes, for a packet destined for a destination node in another domain in a multi-domain network, adding a list of Segment Identifiers (SIDs) to the packet for loose source-based routing from a source node, through a first domain, and to the another domain; and forwarding the packet via a port with the list of SIDs, wherein the list of SIDs includes at least one SID representing both an anycast SID and a binding SID. The method can further include receiving the packet from the first domain at a border node; popping the at least one SID;

and adding one or more SIDs at the border node based on a policy at the border node. The at least one SID can be associated with an anycast group that includes a plurality of nodes in a second domain, connected to the first domain. The first domain can be configured to send the packet with the at least one SID to a closest node of the plurality of nodes. The at least one SID can be associated with a binding segment in the second domain, and the binding segment includes a different SID list for each node of the plurality of nodes. The method can further include, responsive to a failure associated with one of the plurality of nodes, forwarding the packet to another node in the anycast group.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
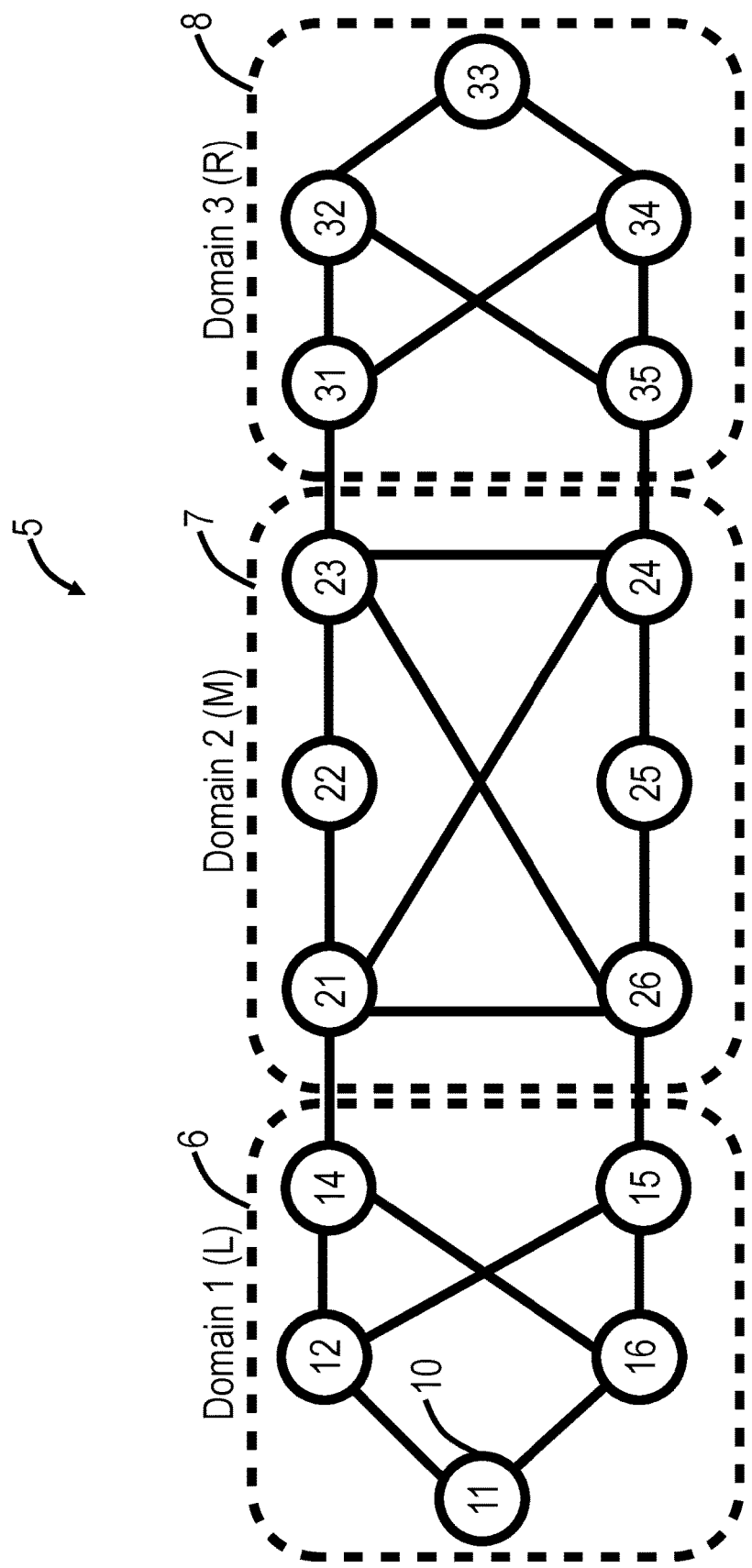
FIG. 1 is a network diagram of a network that includes three domains.

The present disclosure relates to systems and methods for resolving label depth and protection with a Branch Segment Identifier (SID) in a loose source routing-based technology in a homogeneous or heterogeneous network with one or multiple transport domains. Specifically, the present disclosure includes a new Segment Identifier (SID), referred to herein as a Branch SID, that provides protection across domains while operating within the label depth constraints. The present disclosure addresses the label depth problem and protection across domains in SR, MPLS, or any other loose source-based routing protocol. The Branch SID can be a new type of Segment ID that is similar to a Binding SID (BSID) from an SR Global Block (SRGB). The Branch SID is allocated on dual-homed border nodes and flooded upstream as an anycast SID. This BSID can be bound to any transport type to take the traffic across a domain.

A loose source routing-based technology is where a source node lists certain nodes that a packet must visit on the way to the destination, while in-between the certain nodes, the packet can be sent wherever required. This is contrasted to strict source routing in which every step is decided in advance. A homogeneous network is a network where all the nodes have the same function or use the same protocol in the network. A heterogeneous network is a network where there are two or more classes of nodes categorized by function, utility, protocol, etc.

In an embodiment, the present disclosure relates to a homogenous loose source routing-based technology such as various Segment Routing domains or other types of protocols supporting loose source-routing. The present disclosure can be applied directly to Segment Routing, which is based on loose source routing technology. In another embodiment, the present disclosure is also directly applicable to loose source routing itself.

In another embodiment, the present disclosure is applicable to heterogeneous networks with loose source routing-based technology along with MPLS-based technology. In one embodiment, the network domains could be Segment Routing, Resource Reservation Protocol (RSVP), and a Label Distribution Protocol (LDP) network. In other embodiments, the network domains could be a combination of Segment Routing with either an RSVP or LDP network.

In a further embodiment, the present disclosure is applicable to Ad hoc or infrastructure mode wireless networks where Segment Routing is applicable to incorporate fault tolerance and redundancy to minimize loss of service. Without loss of generality, the present disclosure also contemplates 5G networks. Further, the present disclosure is applicable in multimedia networks, including unicast, multicast, and broadcast technologies. In an embodiment, the proposed branch SID can be used as a node SID for a Designated Router (DR). Finally, the present disclosure is applicable in Internet Protocol version 4 (IPv4) and Internet Protocol version 6 (IPv6) networks for both wired, wireless, and optical networks.

Advantageously, the present disclosure utilizes/combines existing techniques from Segment Routing to solve both the protection and label depth issues. The present disclosure operates with existing techniques, including MPLS (RSVP-TE and LDP) and Segment Routing. Accordingly, the present disclosure can be seamlessly integrated with existing infrastructure. Further, the present disclosure can be configured manually or via Software Defined Networking (SDN).

Overview

In loose source routing, the source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and simple to deploy.

Segment Routing (SR) natively supports both IPv6 (SRv6) and MPLS (SR-MPLS) forwarding planes and can co-exist with other transport technologies, e.g., RSVP-Traffic Engineering (RSVP-TE) and LDP. The techniques described herein can be applied to SRv6 and SR-MPLS networks as well as other transports when they interact with SR transport. The present disclosure is described with reference to Segment Routing in particular, but those of ordinary skill in the art will recognize the Branch SID described herein can be used with any loose source routing-based technology.

Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID).

All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SR-MPLS, SRGB is a local property of a node and identifies the set of local labels reserved for global segments. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A headend node of the SR policy binds a binding SID to its policy. When the headend node receives a packet with an active segment matching the binding SID of a local SR Policy, the headend node steers the packet into the associated SR Policy. The binding SID provides greater scalability, network opacity, and service independence. Instantiation of the SR Policy may involve a list of SIDs. Any packets received with an active segment equal to binding SID are steered onto the bound SR Policy. The use of a binding SID allows the instantiation of the policy (the SID list) to be stored only on the node or nodes that need to impose the policy. The direction of traffic to a node supporting the policy then only requires the imposition of the binding SID. If the policy changes, this also means that only the nodes imposing the policy need to be updated. Users of the policy are not impacted. The binding SID can be allocated from the local or global domain. It is of special significance at the headend node where the policy is programmed in forwarding.

An anycast segment is a type of prefix segment that represents an anycast group and is advertised with its P-Flag (no PHP) bit set for ISIS, NP-Flag for OSPFv2, and for OSPFv3 set prefix SID sub-Type-Length-Value (TLV) bit to 1 and E-Flag to 0. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group.

Problem Statement

Figure 10:
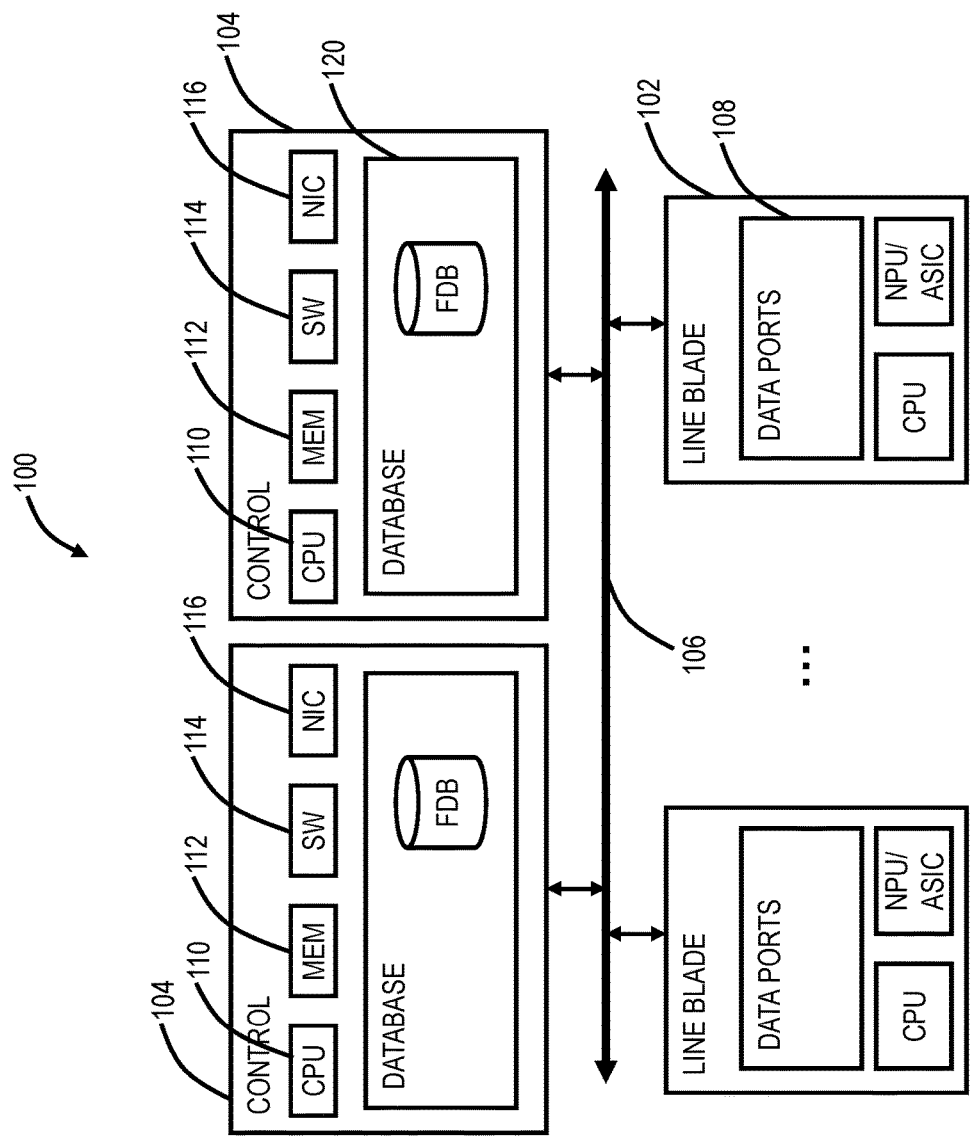
FIG. 10 is a block diagram of an implementation of a node, such as for the node in the various networks described herein.
Figure 11:
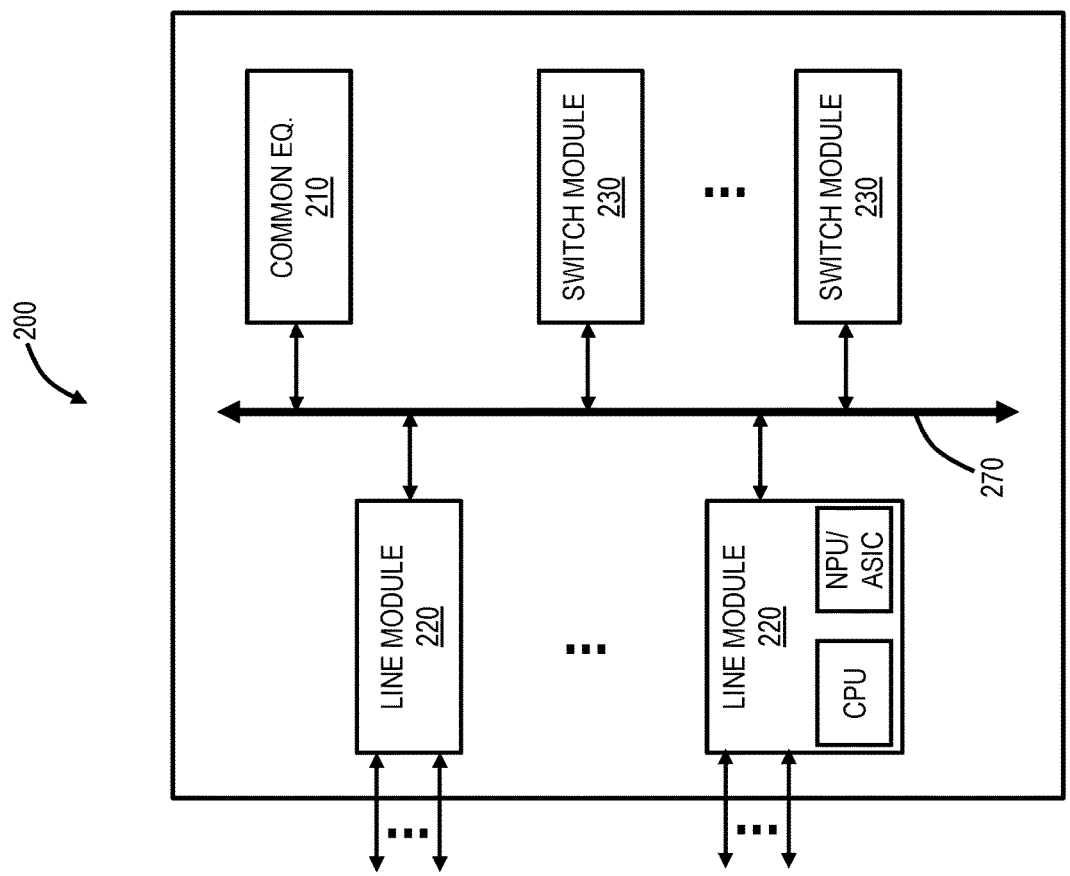
FIG. 11 is a block diagram of another implementation of a node, such as for the node in the various networks described herein.

FIG. 1 is a network diagram of a network 5 that includes three domains 6, 7, 8. The network 5 includes various interconnected nodes 10, that are labeled as nodes 11, 12, 14, 15, 16, 21, 22, 23, 24, 25, 26, 31, 32, 33, 34, 35. As is known in the art, the nodes 10 can be physical and/or virtual network elements that support packet switching and forwarding. Two example implementations of the nodes 20 are illustrated in FIGS. 10 and 11.

For redundancy purposes, inter-domain connections are dual-homed such that when one connection breaks, the other takes over as primary, or they can load share, and then in case of failure, 100% of the traffic is moved to the remaining connection. In FIG. 1, the dual-homing between the domains 6, 7 is via the nodes 14, 15, 21, 26, and the dual-homing between the domains 7, 8 is via the nodes 23, 24, 31, 35. For Segment Routing, the dual-homing is achieved by adding an anycast SID for the two dual-homed nodes in the SID list, and it will take the traffic to the next device in anycast group if one goes down.

This approach, using the anycast SID, does not work well. First, it presents problems when the stack depth required to pass the domains is more than the Maximum SID Depth (MSD). Second, Shortest Path First (SPF) trees can be very different on anycast group member devices resulting in traffic drop or micro loops or not meeting the SLAs. Third, it does not work if the domain being crossed, namely the domain 7, is not an SR domain.

Objective

The present disclosure achieves optimal SID depth without compromising on protection in a loose source routing-based technology such as Segment routing. Presently, the anycast SID is used across the domains 6, 7, 8 for protection purposes, however, at the cost of exceeding maximum SID depth (MSD). The binding SID is used across the domains 6, 7, 8, for minimizing SID depth. However, binding SID does not provide protection across the domains 6, 7, 8. The present disclosure contemplates making an anycast SID into a binding SID, which is backed by a transport (any transport), to negate the MSD issue. Hence, the present disclosure provides a new solution to the problem of achieving protection while optimizing maximum SID depth. Even in the simple case of using a Topology Independent-Loop Free Alternate (TI-LFA) to achieve fault-tolerance, the present disclosure is still applicable to optimize MSD.

The present disclosure provides a new SID, namely a branch SID, that accomplishes the combined role of providing protection and optimizing maximum SID depth.

Proposed Solution

Again, referring to FIG. 1, there are the three domains 6, 7, 8 with the domain 7 being a transit domain that can be of any of the following types, such as Segment Routing, RSVP-TE, and LDP. The present disclosure extends TI-LFA protection to an anycast SID and provides a mechanism to all members of the anycast group to maintain optimal transport paths to requested destination independent of paths configured on other anycast members.

In FIG. 1, assume traffic flows from left to right, namely from the domain 6 to the domain 7 to the domain 8. For example, for packets moving from the node 11 to the node 33, the packets have to cross nodes in the domain 7. The node 11 is a source router in the domain 6. The nodes 21, 26 are the border routers #1, #2 for the domain 7, and the nodes 31, 35 are the border routers #1, #2 for the domain 8. The node 33 is the destination router for the domain 8.

Figure 2:
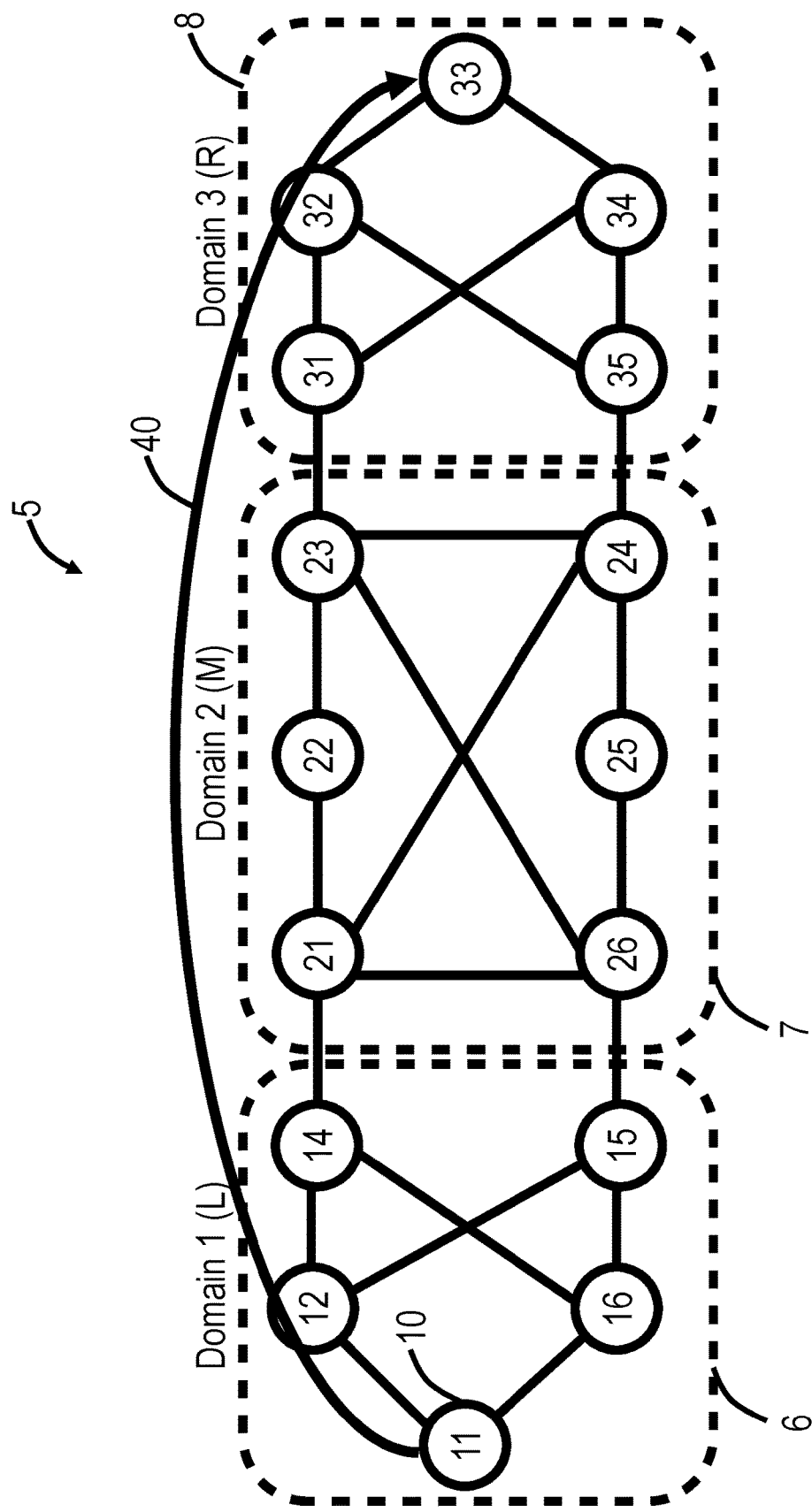
FIG. 2 is a network diagram of the network of FIG. 1 illustrating a path taken by packets from the node 11 to the node 33 when traditional transport is used.

FIG. 2 is a network diagram of the network 5 illustrating a path (tunnel 40) taken by packets from the node 11 to the node 33 when traditional transport is used. In the illustration, e RSVP-TE, a well-known MPLS based transport signaling mechanism, is used to reach the node 33. An RSVP-TE tunnel is set up from the node 11 (source) to the node 33 (destination), and each transit node (Label Switch Router (LSR)) has to participate in resource reservation and save the state.

Figure 3:
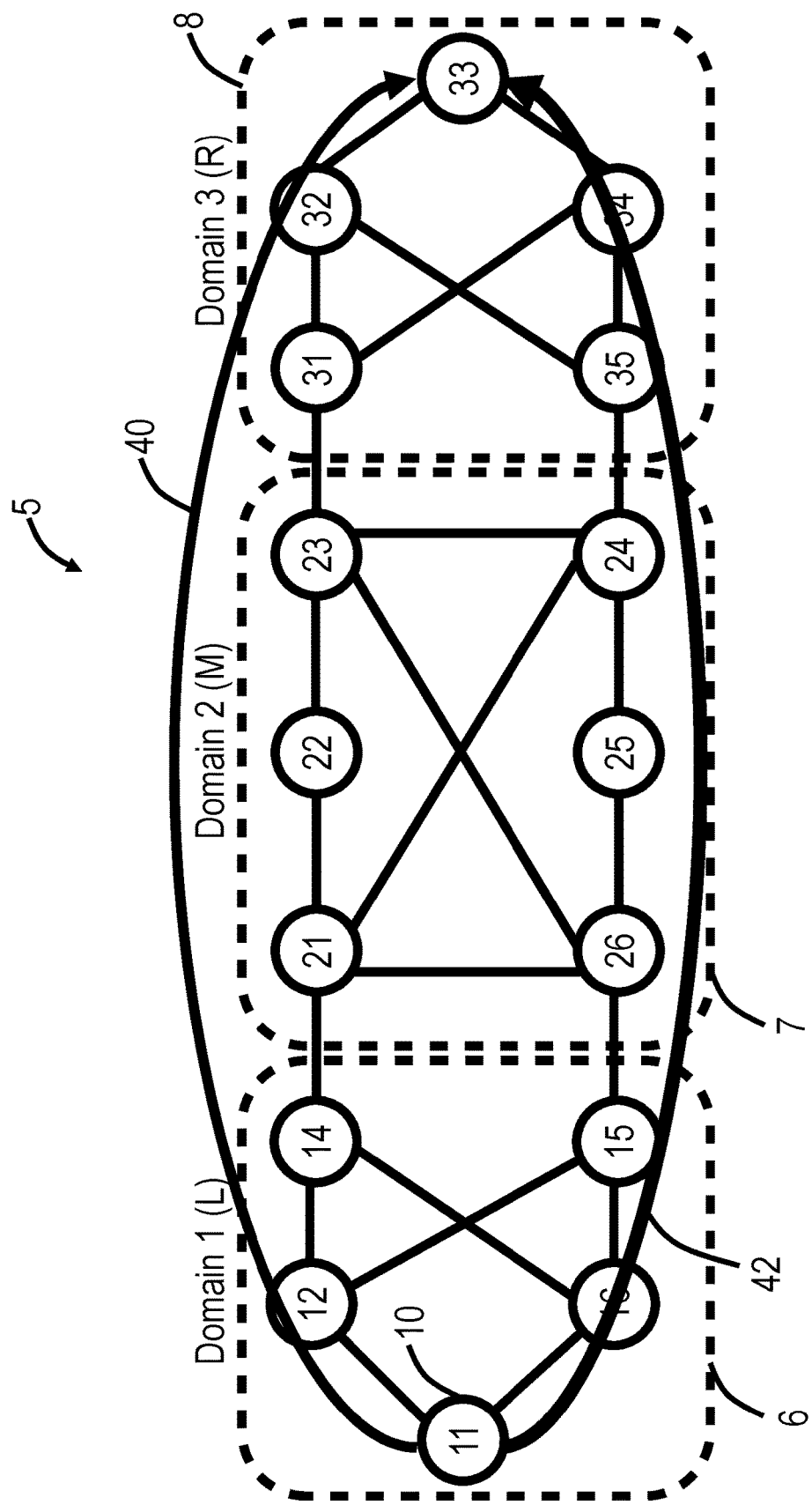
FIG. 3 is a network diagram of the network of FIG. 1, illustrating a backup Fast Reroute (FRR) tunnel for protecting the path in FIG. 2.

In this technology, states are maintained, however, inter-domain RSVP-TE control is difficult due to lack of transparency or visibility into third-party domains. Also, RSVP-TE inherently does not provide protection. If a protected path is needed, additional mechanisms such as Fast Reroute (FRR) need to be used, as illustrated in FIG. 3. Here, a backup FRR RSVP-TE tunnel 42 is set up from the node 11 to the node 33. The backup tunnel 42 also requires resource reservations leading to states on the transit nodes. Additionally, this requires multi-hop Bidirectional Forwarding Detection (BFD) on the tunnel 40 to detect failures, for switching to the backup tunnel 42. Thus, for fast switching, additional protocols need to be run, and the setup of the alternate path is not done during run-time. It has to be pre-established and configured.

Segment Routing

Figure 4:
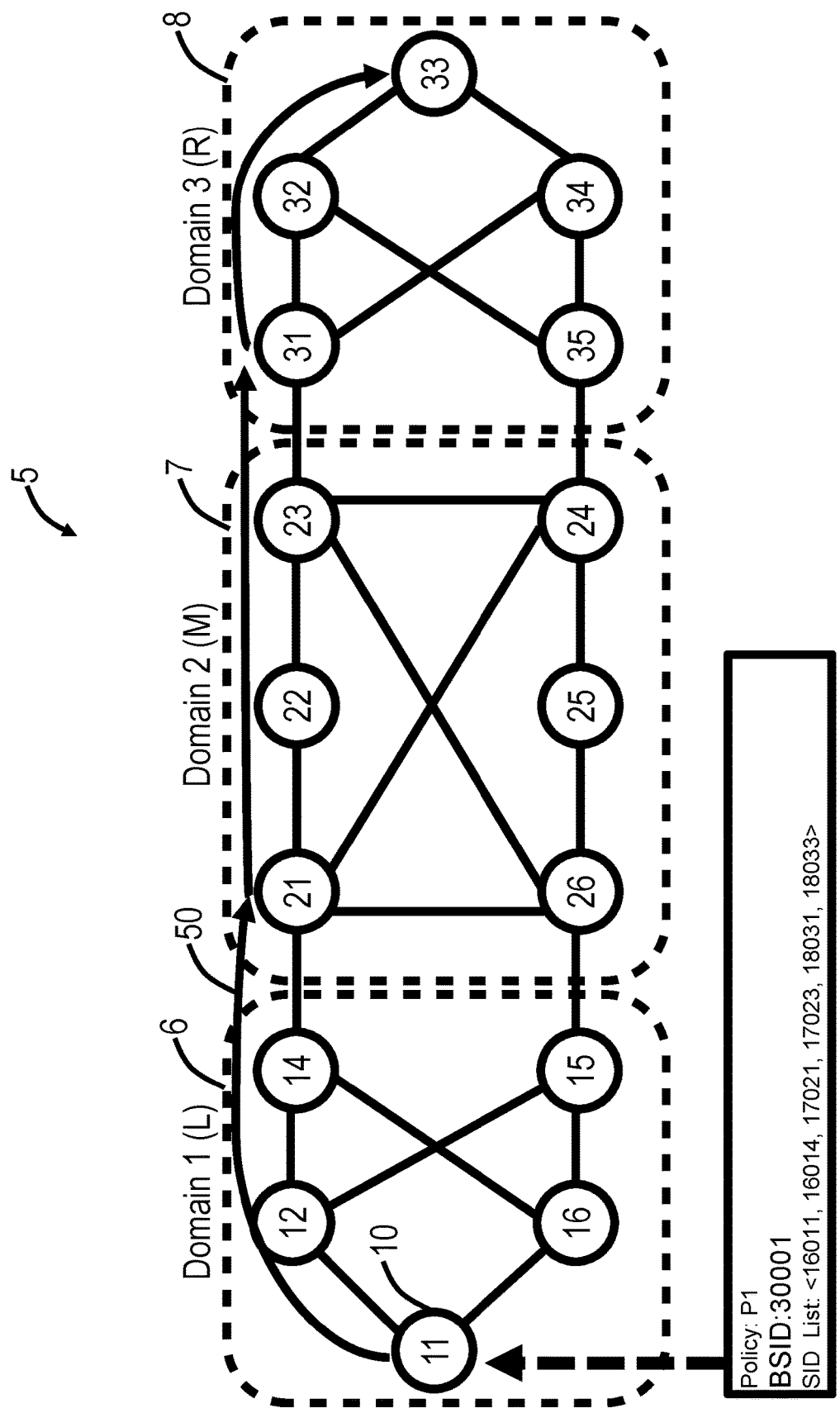
FIG. 4 is a network diagram of the network of FIG. 1 for illustrating Segment Routing.

FIG. 4 is a network diagram of the network 5 for illustrating Segment Routing. Specifically, in FIG. 4, how traffic flows from the node 11 to the node 33 in a Segment Routing-based network is illustrated. The traffic flows on a path 50. Specifically, the traffic originates in the node 11 in the domain 6, passes through the nodes 12, 14, and traverses to the next domain 7 (the nodes 21, 22, 23) to reach the node 33 in the domain 8, via the nodes 31, 32. At the node 11, the packet is provided the SIDs of 16011, 16014, 17021, 17023, 18031, 18033 (where 1X0YY—X is the domain, and YY is the node). Each node looks at the top label and takes forwarding decisions if that LER is the penultimate hop. There is no state maintained in transit nodes, i.e., Label Switching Routers (LSRs). This approach requires six SIDs and some LERs are not capable of imposing so many labels, there is a maximum SID depth. Note, a packet originating at the node 11 and destined for the node 33 includes labels such as a binding SID (BSID) 30001 for a policy P1 and the prefix SIDs 16011, 16014, 17021, 17023, 18031, 18033.

Figure 5:
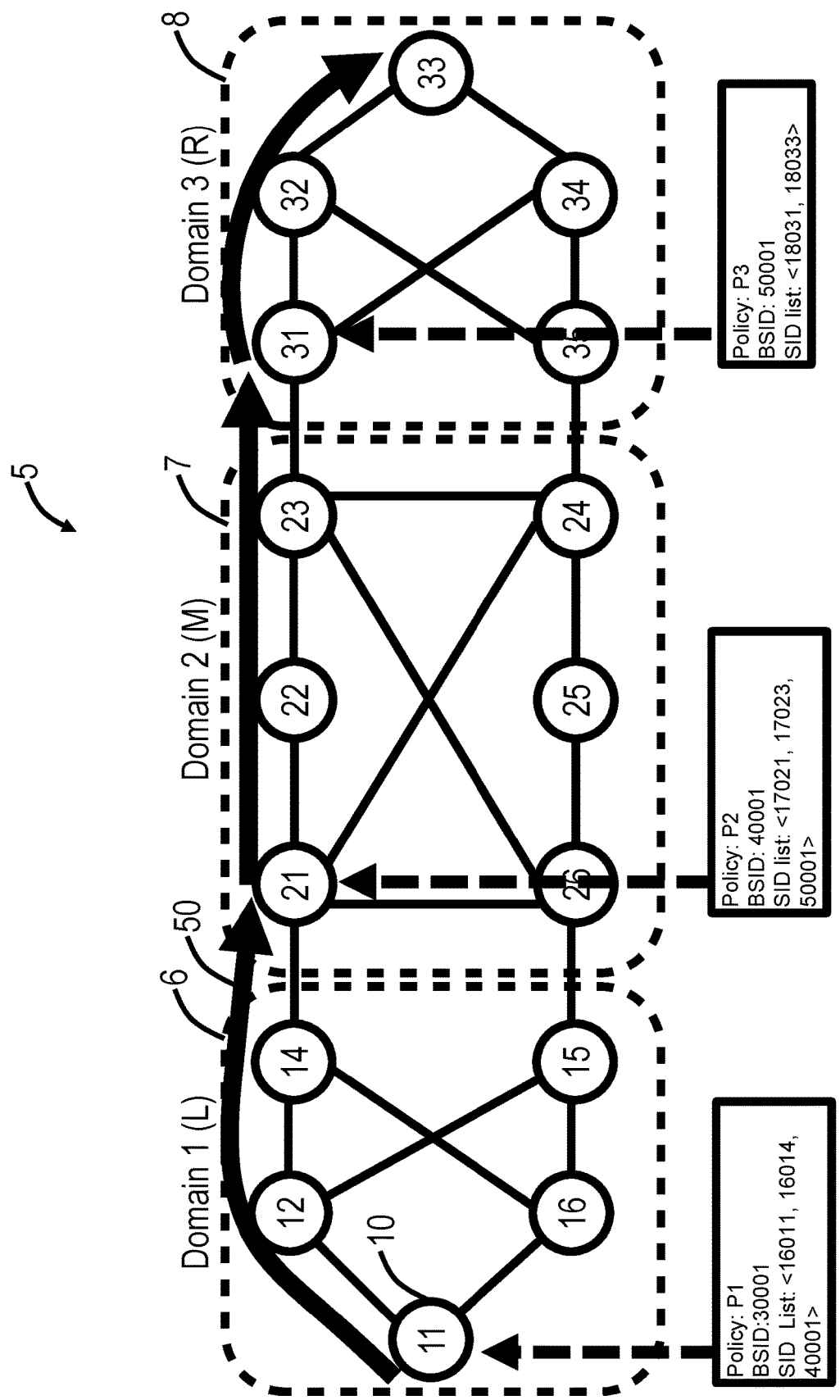
FIG. 5 is a network diagram of the network illustrating Segment Routing and the use of three binding SIDs.

To solve the maximum SID depth issue, Segment Routing provides the binding SID as a mechanism to stitch the path and reduce the SID depth. FIG. 5 is a network diagram of the network 5 illustrating Segment Routing and the use of three binding SIDs. For example, a packet originating at the node 11 and destined for the node 33 includes SIDs 16011, 16014, 40001 where 16011, 16014 are prefix SIDs and 40001 is a binding SID that denotes the node 21 in the domain 7 and the destination of the node 33 in the domain 8. At the node 21, the binding SID 40001 is popped and replaced with SIDs 17021, 17023, 50001 where 17021, 17023 are prefix SIDs, and 50001 is a binding SID that denotes the node 31 in the domain 8 and the destination of the node 33 in the domain 8. At the node 31, the binding SID 50001 is popped and replaced with SIDs 18031, 18033. Thus, the binding SID reduces the SID depth.

Figure 6:
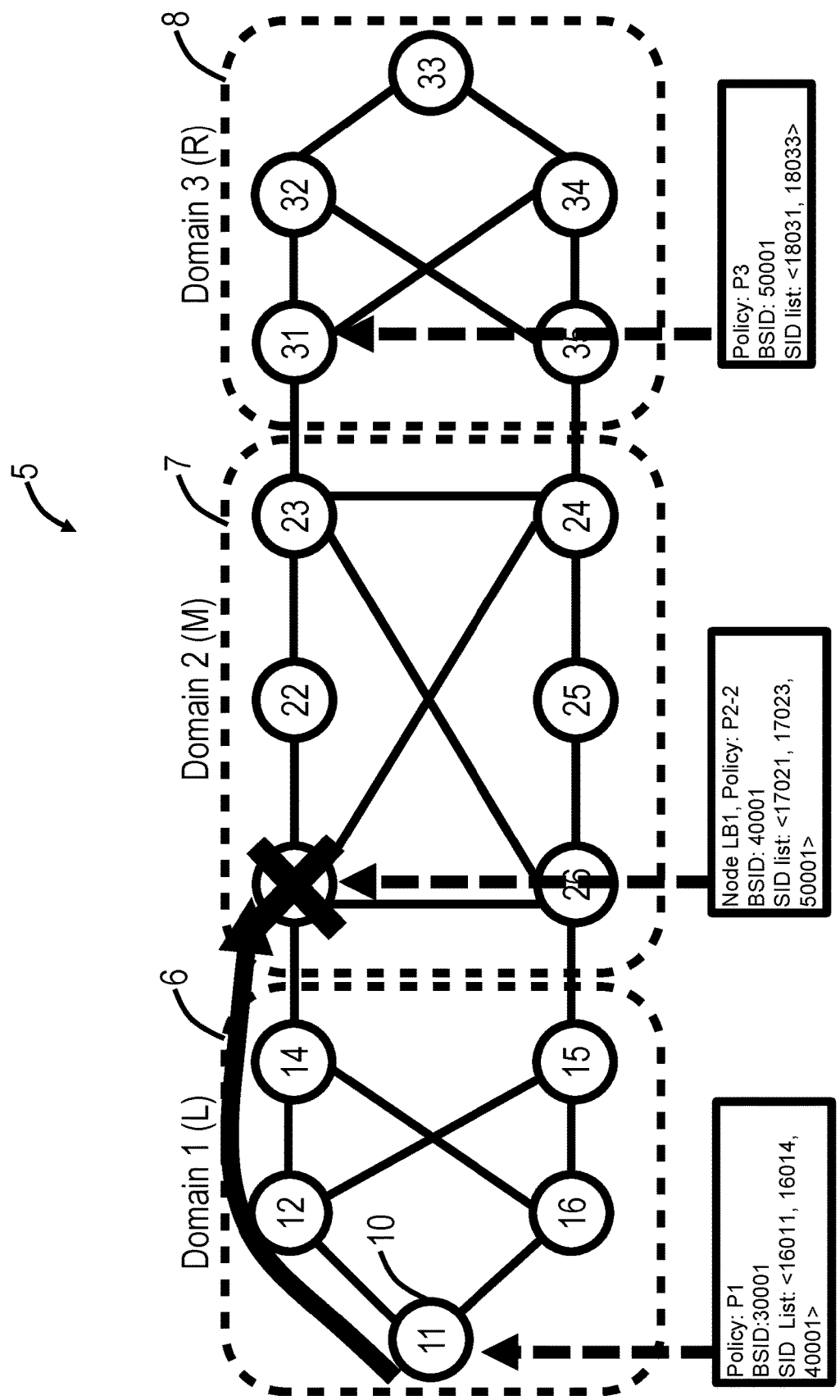
FIG. 6 is a network diagram of the network illustrating Segment Routing, the use of three binding SIDs, and a node failure between two of the domains.

Though the binding SID addresses the SID depth, there are failure cases in a dual-homing situation where, e.g., the node 21 fails, as illustrated in FIG. 6, and connectivity is lost. FIG. 6 is a network diagram of the network 5 illustrating Segment Routing, the use of three binding SIDs, and a node failure between two of the domains. In this example, the node 21 in the domain 7 fails. Packets cannot reach the node 21 and are dropped in the node 14. There is a way to solve this in Segment Routing.

Segment Routing includes the anycast SID to handle the failure situation. The anycast SID provides the ability of two nodes to advertise the same prefix SID so if one fails, it can go to the other. However, there is a major problem—the anycast SID exasperates the condition by increasing the number of SIDs without adhering to maximum SID depth limits. For an implementation that has maximum SID depth as a constraint, the anycast SID to address protection is not optimal. Actually, it is a blocker.

Branch SID

The present disclosure provides a mechanism that addresses both protection and maximum SID depth. As described herein, the present disclosure contemplates a new SID, referred to herein as a branch SID. The branch SID provides protection, similar to the anycast SID, and policies to overcome maximum SID depth, similar to the binding SID. That is, the branch SID is a combination of the anycast SID and the binding SID. Those of ordinary skill in the art will recognize other names may be used for the branch SID, and all such naming conventions are contemplated. That is, the present disclosure includes a combination of the functions of the anycast SID and the binding SID into a new class of SID, which may have any name. The present disclosure merely refers to this new class of SID as a branch SID, and any other naming convention is contemplated with the same functionality, Again, a binding SID defines a policy, which can be used to represent multiple labels (SIDs) to solve the maximum SID depth issue. As noted in FIG. 5, the binding SID 40001 in the domain 6 represents the node 21 in the domain 7 and the ultimate destination of the node 33 in the domain 8. The binding SID in the domain 7 represents the node 31 in the domain 8 and the ultimate destination of the node 33. Thus, the entire domains 7, 8 can be represented as a single binding SID.

Again, the use of the binding SID allows the instantiation of the policy (the SID list) to be stored only on the node or nodes that need to impose the policy. In FIG. 5, the node 21 knows to replace the binding SID 40001 with a SID list of 17021, 17023, 50001, and the node 31 knows to replace the binding SID 50001 with a SID list of 18031, 18033. If the policy changes, this also means that only the nodes imposing the policy need to be updated. Users of the policy are not impacted. The binding SID can be allocated from the local or global domain. It is of special significance at the headend node where the policy is programmed in forwarding. That is, in the example of FIG. 5, the headend nodes are the nodes 21, 31 for the binding SIDs 40001, 50001, respectively.

Again, the anycast SID is used for protection. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group. In the example of FIG. 5, the dual-homing can be protected via the anycast SID. For example, the nodes 21, 26 can be in an anycast group for the domain 7, and the nodes 31, 35 can be in an anycast group for the domain 8. However, the anycast SID works like a prefix SID and requires a label for each multi-hop, again this does not work given a lower maximum SID depth.

Figure 7:
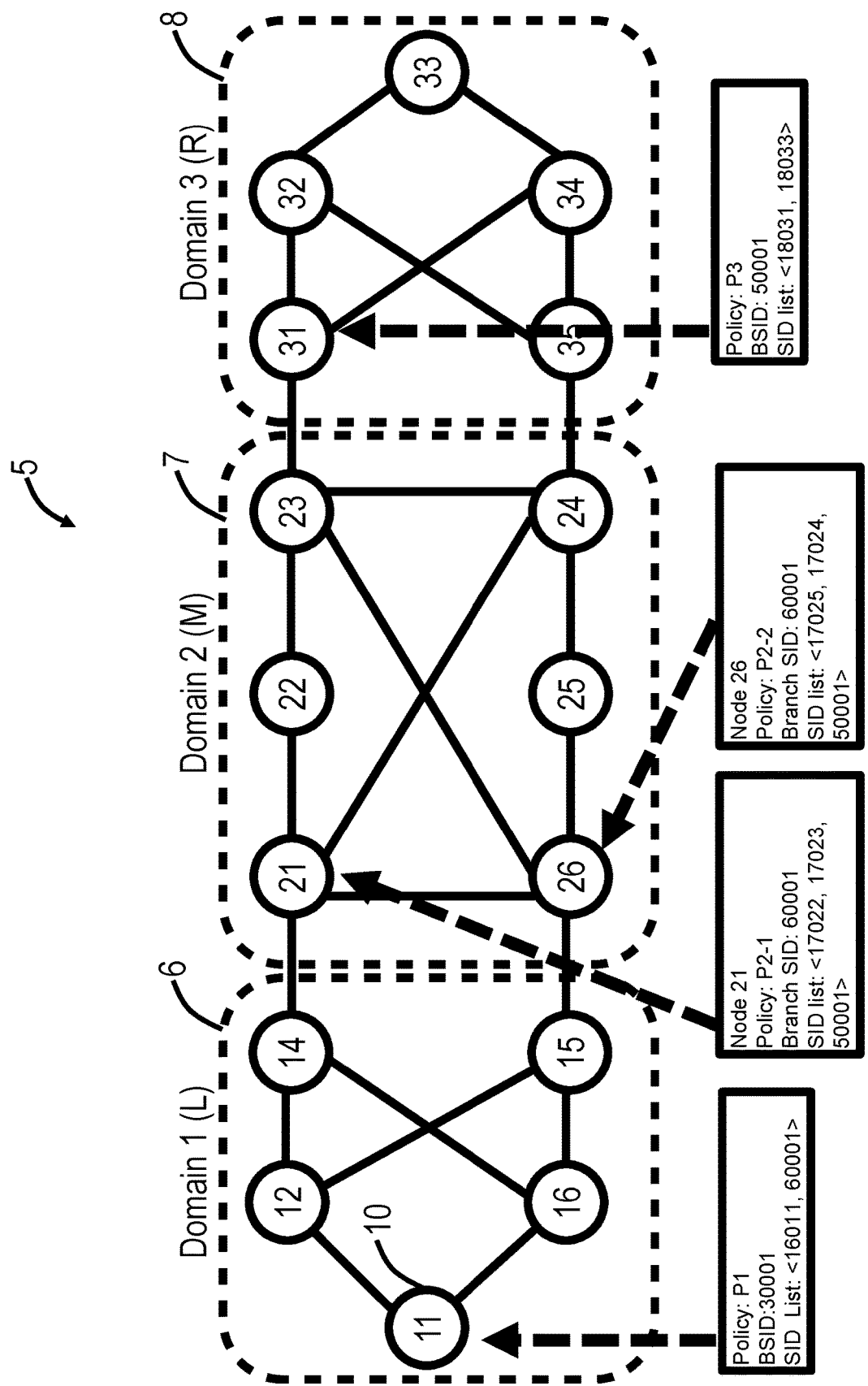
FIG. 7 is a network diagram of the network illustrating Segment Routing and the use of a new class of SID, e.g., a branch SID, to combine the functionality of an anycast SID and a binding SID.

Thus, the present disclosure provides a new class of SID that provides similar functions as the binding SID and the anycast SID. FIG. 7 is a network diagram of the network 5 illustrating Segment Routing and the use of a new class of SID, e.g., a branch SID, to combine the functionality of an anycast SID and a binding SID. In the domain 7, for every transit path through the domain 7, a pair of Segment Routing policies, e.g., P2-1, P2-2 are created on the dual-homed border nodes 21, 26 towards the domain 6, which use their own version of constrained path to cross over to the border routers on the other end. These policies use anycast SIDs for the border routers at the tail. Border routers at the tail will allocate an anycast SID (ASID-R) and advertise it upstream into the network 5. In the example of FIG. 7, the node 11 provides a SID list of 16011, 60001, where 60001 is a branch SID with an anycast group, including the nodes 21, 26.

The SID 60001 corresponds to the polices P2-1, P2-2. That is, the policies P2-1, P2-2 will allocate the binding segments that are defined at the nodes 21, 26. For example, the node 21 will replace the SID 60001 with the SID list 17021, 17023, 50001, and the node 26 will replace the SID 60001 with the SID list 17025, 17024, 50001. In this example, the SID 50001 is a binding SID same as in FIG. 5. Thus, the branch SID 60001 operates both as an anycast SID and as a binding SID—the packet originating at the node 11 can go to any node in the anycast group, namely the nodes 21, 26, and at the nodes 21, 26, the branch SID 60001 is replaced with a SID list based on the associated policies.

The branch SID can be allocated in the same manner as binding SIDs, e.g., via manual configuration or using a controller for domain-wide visibility. The last SID for the SID list of the policies P1 and P2 can be ASID-R (50001 in FIG. 7). Using BSID-L in Domain 1 (L) will ensure traffic makes it to the closest outbound border node (either node 14 or 15). Flooding the ASID-R will ensure the TI-LFA path is computed for it.

Figure 8:
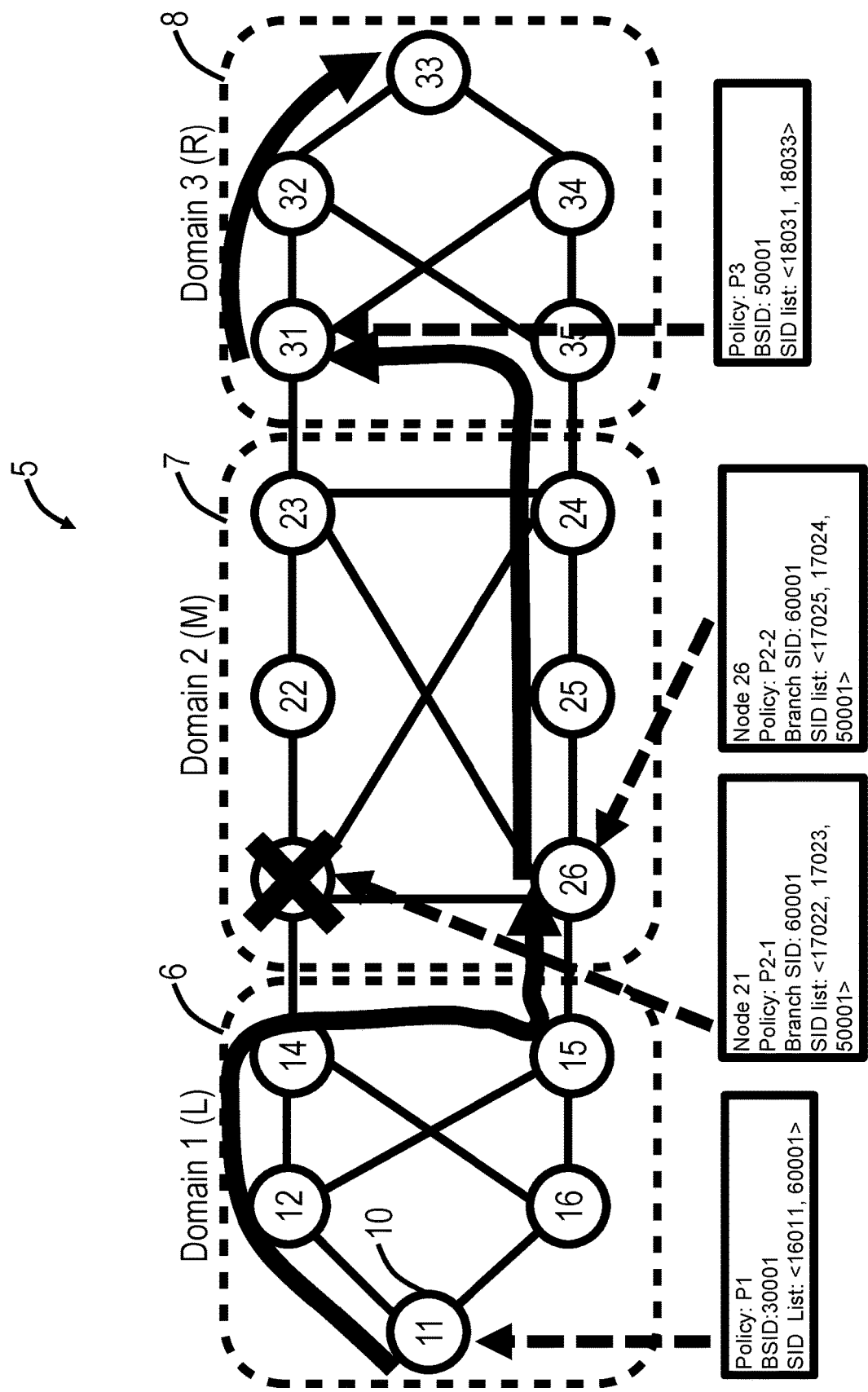
FIG. 8 is a network diagram of the network 5 illustrating Segment Routing and the use a new class of SID, e.g., a branch SID, to combine the functionality of an anycast SID and a binding SID, with a failure example.

FIG. 8 is a network diagram of the network 5 illustrating Segment Routing and the use of a new class of SID, e.g., a branch SID, to combine the functionality of an anycast SID and a binding SID, with a failure example. At the node 11 in the domain 6, destinated for the node 33 in the domain 8, has a SID list of 16011, 60001 added where the branch SID 60001 is both an anycast SID having the anycast group of the nodes 21, 26 and a binding SID having respective policies for each of the nodes 21, 26. The packet is forwarded to the node 14 through the domain 6. In FIG. 8, the node 21 has failed. As such, the node 14 forwards the packet toward the node 26 via the node 15 due to the anycast group. At the node 26, the node 26 recognizes the branch SID 60001 and replaces it with its local policies P2-2 which include the SID list 17025, 17024, 50001.

Thus, both protection is provided, and maximum SID depth is maintained using the SID 60001.

RSVP-TE

When the domain 7 is an RSVP-TE domain, every transit path through the domain is a pair of RSVP-TE tunnels with their own protection mechanism. Each of these tunnels will have an RSVP-TE binding SID allocated and advertised upstream. In the ingress Segment Routing domain 6, there will be no difference in the processing of anycast segment.

LDP

For Segment Routing to interoperate with LDP, a mapping server is required. The border router of transit domain 7 has to be Segment Router and LDP capable. For every transit path through the LDP domain, the allocated SID, for the purpose of traversing the domain, will be allocated as an anycast SID and announced as such upstream. All protection in the LDP domain will work independently of SR domains. In the ingress SR domain 6, there will no difference in the processing of anycast segment.

Process

Figure 9:
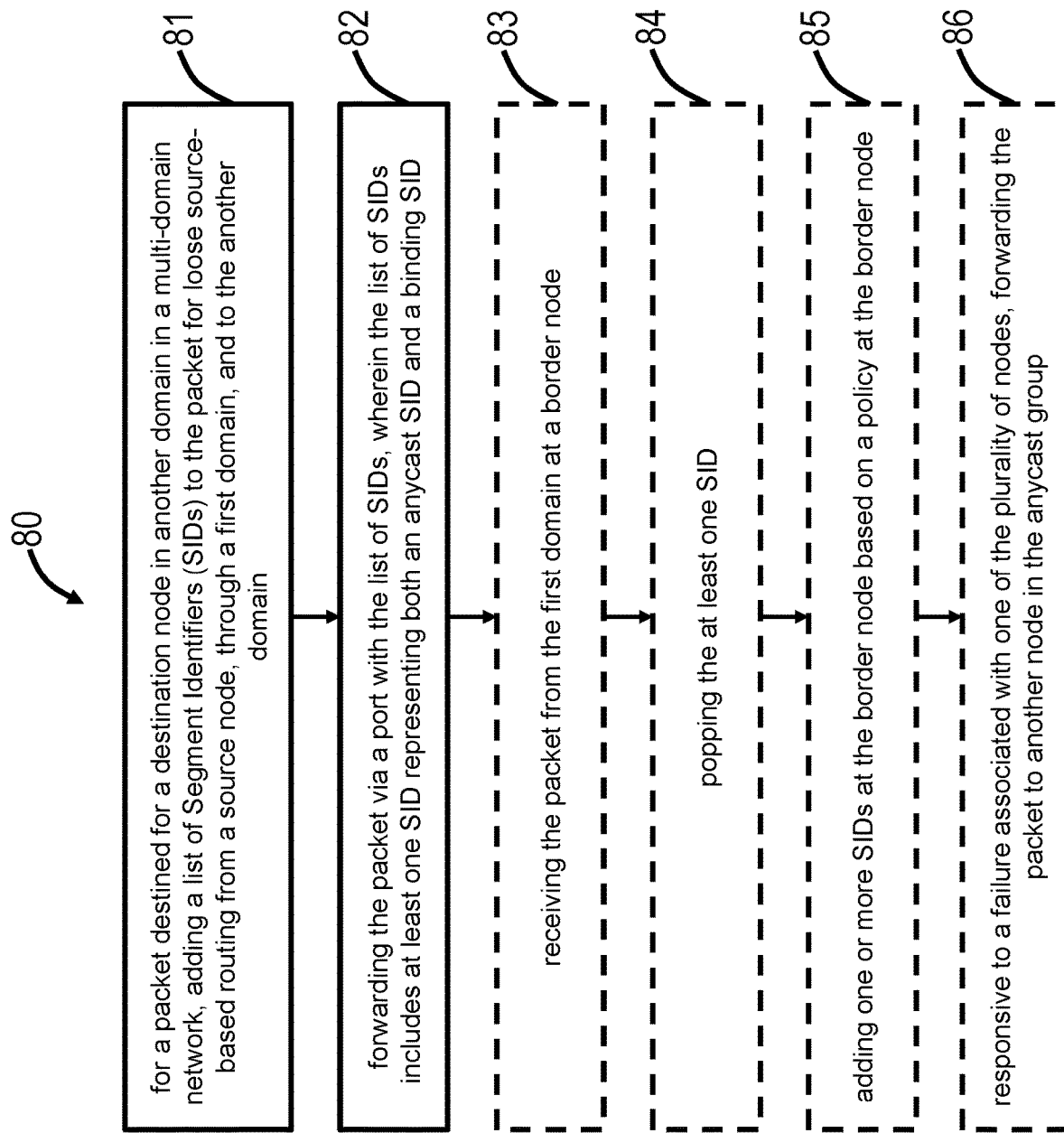
FIG. 9 is a process 80, performed by one or more nodes in the network, to resolve label depth limitations and provide protection in Segment Routing.

FIG. 9 is a process 80, performed by one or more nodes in the network 5, to resolve label depth limitations and provide protection in Segment Routing. The process 80 includes, for a packet destined for a destination node in another domain in a multi-domain network, adding a list of Segment Identifiers (SIDs) to the packet for loose source-based routing from a source node, through a first domain, and to the another domain (step 81); and forwarding the packet via a port with the list of SIDs (step 82), wherein the list of SIDs includes at least one SID representing both an anycast SID and a binding SID.

The at least one SID can be associated with an anycast group that includes a plurality of nodes in a second domain, connected to the first domain. The first domain can be configured to send the packet with the at least one SID to a closest node of the plurality of nodes. The at least one SID can be associated with a binding segment in the second domain, and the binding segment includes a different SID list for each node of the plurality of nodes.

The process 80 can further include receiving the packet from the first domain at a border node (step 83); popping the at least one SID (step 84); and adding one or more SIDs at the border node based on a policy at the border node (step 85). The process 80 can further include, responsive to a failure associated with one of the plurality of nodes, forwarding the packet to another node in the anycast group (step 86).

Node

FIG. 10 is a block diagram of an implementation of a node 100, such as for the node 10. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and/or optical devices mounted on a circuit board along with various interconnects including interfaces to the chassis, shelf, etc.

Two example blades are illustrated with line blades 102 and control blades 104. The line blades 102 include data ports 108, such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108, allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), integrated on the line blade 102, or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data, and the like. In this embodiment, the node 100 includes two control blades 104, which may operate in a redundant or protected configuration such as 1:1, 1+1, etc.

FIG. 11 is a block diagram of another implementation of a node 200. For example, the node 100 can be a dedicated switch, whereas the node 200 can be a multiservice platform. In an embodiment, the node 200 can be a nodal device that may consolidate the functionality of a Multi-Service Provisioning Platform (MSPP), Digital Cross-Connect (DCS), Ethernet and Optical Transport Network (OTN) switch, Dense Wave Division Multiplexed (DWDM) platform, etc. into a single, high-capacity intelligent switching system providing Layer 0, 1, and 2 consolidation. In another embodiment, the node 200 can be any of an Add/Drop Multiplexer (ADM), an MSPP, a DCS, an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc.

In an embodiment, the node 200 includes common equipment 210, one or more line modules 220, and one or more switch modules 230. The common equipment 210 can include power; a control module; Operations, Administration, Maintenance, and Provisioning (OAM&P) access; and the like. The common equipment 210 can connect to a management system such as a Network Management System (NMS), an Element Management System (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an embodiment, the line modules 220 can form ingress and egress switches with the switch modules 230 as center stage switches for a three-stage switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short-reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity, etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1: N, etc.

In context of the systems and methods described herein, the node 100 includes packet switching functionality which can be implemented in circuitry and located on the line blade 102, the control blade 104, in the switching fabric at some point, etc. Similar to the node 100, the node 200 includes packet switching functionality through the line modules 220 and/or the switch modules 230. The node 200 includes packet switching functionality implemented in circuitry and located on the line modules 220, the switch modules 230, the common equipment 210, etc.

Specifically, the process 80 can be implemented in circuitry, logic, hardware, firmware, software, and/or a combination thereof in part in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. In a further embodiment, the node may be an integrated device without a blade, line modules, etc., i.e., a so-called pizza box. For the nodes 100, 200, other architectures providing ingress, egress, and switching are also contemplated for the systems and methods described herein.

In an embodiment, a source node in a first domain in a multi-domain network includes a plurality of ports; and switching circuitry configured to forward packets between the plurality of ports, wherein the source node is configured to, for a packet destined for a destination node in another domain in the multi-domain network, add a list of Segment Identifiers (SIDs) to the packet for loose source-based routing from the source node, through the first domain, and to the another domain, and forward the packet via a port of the plurality of ports and with the list of SIDs, wherein the list of SIDs includes at least one SID representing both an anycast SID and a binding SID.

In another embodiment, a border node in a multi-domain network includes a plurality of ports; and switching circuitry configured to forward packets between the plurality of ports, wherein the border node is configured to receive a packet from a first domain, the packet is destined for a destination node in the same domain or another domain in the multi-domain network, pop a Segment Identifier (SID) from the packet, wherein the SID operates as both an anycast SID and a binding SID, the packet being sent to the border node from the first domain based on the presence of the border node in an anycast group associated with the SID, add one or more SIDs to the packet based on a policy associated with a binding segment for the SID, and forward the packet with the one or more SIDs.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A source node in a first domain in a multi-domain network, the source node comprising:
a plurality of ports; and
switching circuitry configured to forward packets between the plurality of ports,
wherein the source node is configured to
for a packet destined for a destination node in another domain in the multi-domain network, add a list of Segment Identifiers (SIDs) to the packet for loose source-based routing from the source node, through the first domain, and to the another domain, and
forward the packet via a port of the plurality of ports and with the list of SIDs,
wherein the list of SIDs includes at least one SID representing both an anycast SID and a binding SID, and wherein the at least one SID is a single label that causes performance of functionality of both the anycast SID and the binding SID.

2. The source node of claim 1, wherein the at least one SID is associated with an anycast group that includes a plurality of nodes in a second domain, connected to the first domain.

3. The source node of claim 2, wherein the first domain is configured to send the packet with the at least one SID to a closest node of the plurality of nodes.

4. The source node of claim 2, wherein the at least one SID is associated with a binding segment in the second domain, and the binding segment includes a different SID list for each node of the plurality of nodes.

5. The source node of claim 2, wherein the second domain is the another domain.

6. The source node of claim 2, wherein the second domain is a transit domain between the first domain and the another domain.

7. The source node of claim 2, wherein the plurality of nodes are border nodes that are dual homed between the first domain and the second domain.

8. A border node in a multi-domain network comprising:
a plurality of ports; and
switching circuitry configured to forward packets between the plurality of ports,
wherein the border node is configured to
receive a packet from a first domain, the packet is destined for a destination node in a same domain as the border node or another domain in the multi-domain network,
pop a Segment Identifier (SID) from the packet, wherein the SID represents both an anycast SID and a binding SID, the packet being sent to the border node from the first domain based on the presence of the border node in an anycast group associated with the SID, wherein the SID is a single label that causes performance of functionality of both the anycast SID and the binding SID,
add one or more SIDs to the packet based on a policy associated with a binding segment for the SID, and
forward the packet with the one or more SIDs.

9. The border node of claim 8, wherein the SID is associated with the anycast group that includes a plurality of nodes in the same domain or another domain, connected to the first domain.

10. The border node of claim 9, wherein the first domain is configured to send the packet with the SID to a closest node in the same domain.

11. The border node of claim 9, wherein the SID is associated with the binding segment in the same domain or another domain, and the binding segment includes a different SID list for the border node from another node of the plurality of nodes.

12. The border node of claim 9, wherein the border node is in the same domain as the destination node.

13. The border node of claim 9, wherein the border node is in a transit domain between the first domain and a domain containing the destination node.

14. The border node of claim 9, wherein the border node is dual homed between the first domain and the same domain or another domain, with one or more nodes of the plurality of nodes.

15. A method comprising:
for a packet destined for a destination node in another domain in a multi-domain network, adding a list of Segment Identifiers (SIDs) to the packet for loose source-based routing from a source node, through a first domain, and to the another domain; and
forwarding the packet via a port with the list of SIDs, wherein the list of SIDs includes at least one SID representing both an anycast SID and a binding SID, and wherein the at least one SID is a single label that causes performance of functionality of both the anycast SID and the binding SID.

16. The method of claim 15, further comprising
receiving the packet from the first domain at a border node;
popping the at least one SID; and
adding one or more SIDs at the border node based on a policy at the border node.

17. The method of claim 15, wherein the at least one SID is associated with an anycast group that includes a plurality of nodes in a second domain, connected to the first domain.

18. The method of claim 17, wherein the first domain is configured to send the packet with the at least one SID to a closest node of the plurality of nodes.

19. The method of claim 17, wherein the at least one SID is associated with a binding segment in the second domain, and the binding segment includes a different SID list for each node of the plurality of nodes.

20. The method of claim 17, further comprising
responsive to a failure associated with one of the plurality of nodes, forwarding the packet to another node in the anycast group.

* * * * *